United States Patent
Kabune et al.

(10) Patent No.: US 7,085,947 B2
(45) Date of Patent: Aug. 1, 2006

(54) ELECTRONIC CONTROL APPARATUS HAVING A PLURALITY OF POWER SOURCE CIRCUITS

(75) Inventors: Hideki Kabune, Chiryu (JP); Hajime Kumabe, Kariya (JP)

(73) Assignee: Denso Corporation, Kariya (JP)

( * ) Notice: Subject to any disclaimer, the term of this patent is extended or adjusted under 35 U.S.C. 154(b) by 677 days.

(21) Appl. No.: 09/824,709

(22) Filed: Apr. 4, 2001

(65) Prior Publication Data

US 2002/0023241 A1   Feb. 21, 2002

(30) Foreign Application Priority Data

Apr. 28, 2000   (JP)   ............... 2000-130802

(51) Int. Cl.
*G06F 1/28*   (2006.01)
(52) U.S. Cl. ............ 713/340; 713/300; 361/78; 361/79
(58) Field of Classification Search ............... 713/300, 713/310, 324, 340; 323/234; 361/78–79, 361/86–87
See application file for complete search history.

(56) References Cited

U.S. PATENT DOCUMENTS

| | | | | |
|---|---|---|---|---|
| 5,303,143 A | * | 4/1994 | Sommer et al. | 700/79 |
| 5,339,446 A | * | 8/1994 | Yamasaki et al. | 713/340 |
| 5,721,887 A | * | 2/1998 | Nakajima | 713/500 |
| 6,298,449 B1 | * | 10/2001 | Carter | 713/340 |
| 6,330,668 B1 | * | 12/2001 | Curiger et al. | 713/1 |
| 6,559,812 B1 | * | 5/2003 | McCarten et al. | 345/2.1 |

FOREIGN PATENT DOCUMENTS

| | | |
|---|---|---|
| JP | A-61-227668 | 10/1986 |
| JP | A-62-103718 | 5/1987 |
| JP | A-8-139581 | 5/1996 |
| JP | A-2000-092694 | 3/2000 |

* cited by examiner

*Primary Examiner*—John R. Cottingham
*Assistant Examiner*—Paul Yanchus, III
(74) *Attorney, Agent, or Firm*—Posz Law Group, PLC (57) ABSTRACT

In an electronic control apparatus having a one-chip microcomputer and a power output circuit, a voltage abnormality detecting circuit is provided to detect whether an output voltage of each power output circuit is set to a voltage in a predetermined range. A current abnormality detecting circuit is also provided to detect that a current flowing into each power output circuit is in an excessive current condition or in a low current condition. The microcomputer is reset when the detected output voltage or the detected current is abnormal.

2 Claims, 8 Drawing Sheets

ELECTRONIC CONTROL APPARATUS HAVING A PLURALITY OF POWER SOURCE CIRCUITS

CROSS REFERENCE TO RELATED APPLICATION

This application is based on and incorporates herein by reference Japanese Patent Application No. 2000-130802 filed Apr. 28, 2000.

BACKGROUND OF THE INVENTION

The present invention relates to an electronic control apparatus including a plurality of power source circuits which constitute a plurality of kinds of power sources.

In recent years, higher integration and higher processing rate of ICs are rapidly progressing, and thereby a power source voltage used is further lowered. However, in the case of a product under the severe noise environment such as in an automobile, it is impossible to use a lower power source voltage for peripheral circuits from a viewpoint of noise margin.

Therefore, a dual power source circuit that realizes both higher integration density and noise margin is often used to operate the peripheral circuits with a higher voltage and a CPU or the like with a lower voltage. Moreover, a power source line is individually provided for the circuits such as an oscillation circuit or the like which requires reduction of noise due to radiated electromagnetic wave and an A/D converter circuit which requires higher accuracy.

When a one-chip microcomputer having such a plurality of power source lines is used, operation of the microcomputer cannot be ensured during an abnormality of the power source line and operation of the microcomputer becomes unstable when the power source is turned on or turned off. Therefore, when such a one-chip microcomputer is used in ABS (Anti-lock Brake System), it is probable that the brake function will be lessened.

SUMMARY OF THE INVENTION

The present invention therefore has an object to ensure operation of a microcomputer used in a circuit unit using a one-chip microcomputer providing a plurality of kinds of power sources.

Moreover, the present invention has an object to provide a circuit structure to ensure stable operation even when a power source is driven or an abnormality occurs in the power source line.

According to one aspect of the present invention, a plurality of power source circuits are used to provide a plurality of power sources of different voltages. One of these power sources is used as a power source of a microcomputer to detect whether the plurality of power sources are respectively in the specified ranges or not. The microcomputer is reset when any one of the power sources is not in the respective specified ranges. Preferably, the microcomputer is also reset, when a current flowing into power output circuits is detected as not in a specified range.

According to another aspect of the present invention, a plurality of power source circuits providing a power source of a plurality of different voltages are provided for a microcomputer. A power source for a reset control unit in the microcomputer among a plurality of the power sources is driven to become operative earlier than the other power sources. Preferably, the power source for the reset control unit is controlled to become inoperative later than the other power sources.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

In a first embodiment, the present invention is applied to an electronic control unit (ECU) for an anti-lock brake system (ABS) control.

Figure 1:
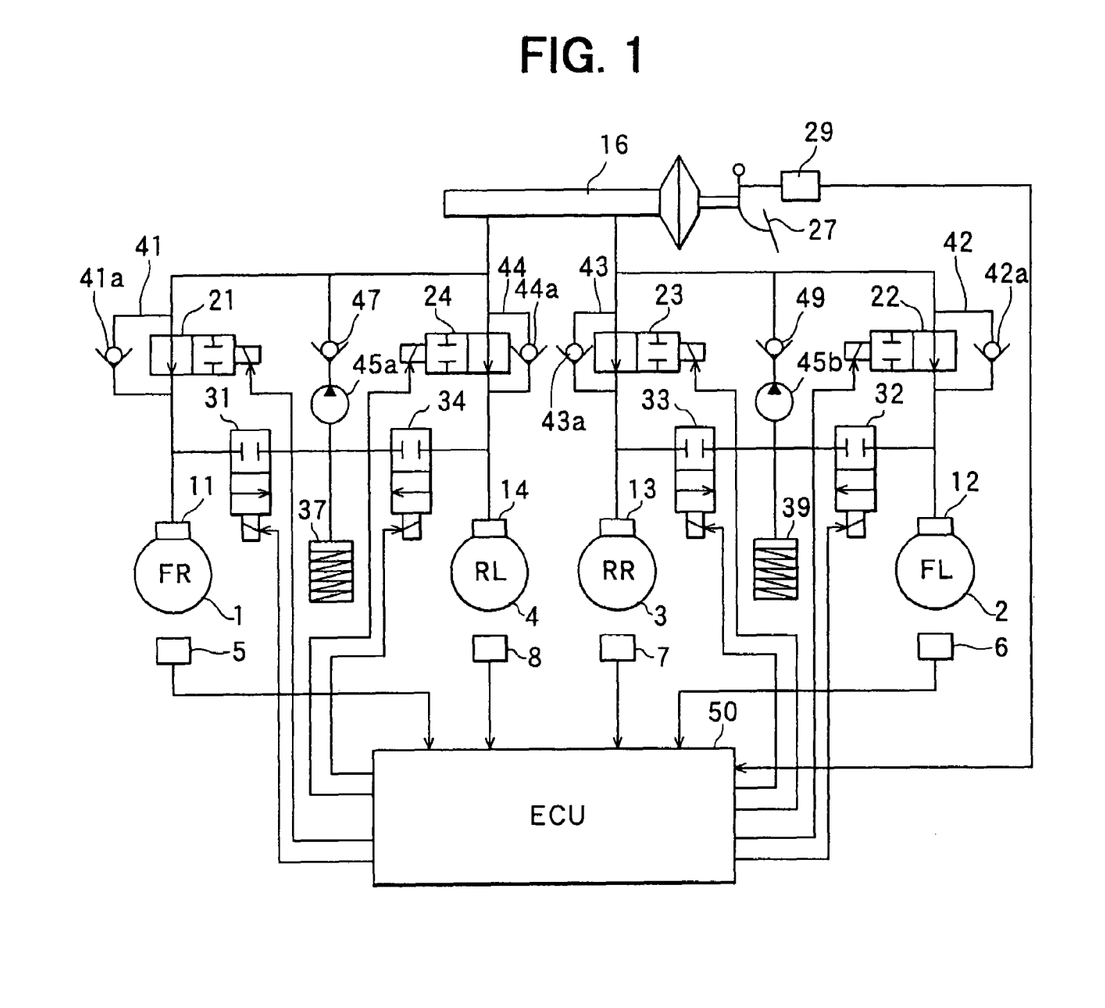
FIG. 1 is a schematic diagram illustrating an ABS control apparatus that is controlled by an ECU according to a first embodiment of the present invention.

Referring first to FIG. 1 showing an ABS control system, a front-right (FR) wheel 1, a front-left (FL) wheel 2, a rear-right (RR) wheel 4 and a rear-left (RL) wheel 4 are provided with an electromagnetic pickup type, a magneto-resistive effect device (MRE) type or a Hall device type wheel speed sensors 5 to 8, respectively. These wheel speed sensors 5 to 8 generate respective pulse signals depending on rotation of the wheels 1 to 4.

Moreover, the wheels 1 to 4 are respectively provided with wheel cylinders 11 to 14. When a master cylinder 16 generates a brake fluid pressure depending on the driver's stepping-on amount of a brake pedal 27, this brake fluid pressure is transferred to the wheel cylinders 11 to 14 via dual-position valves (pressure increase control valves) 21 to 24 and through respective fluid pressure piping. The stepping-on condition of the brake pedal 27 is detected by a stop switch 29.

Moreover, the wheel cylinders 11, 14 are connected with a reservoir 37 via dual-position valves (pressure decrease control valves) 31, 34, respectively. The wheel cylinders 12, 13 are connected with a reservoir 39 via dual-position valves (pressure decrease control valves) 32, 33, respectively.

The dual-position valves 21 to 24 and 31 to 34 are each comprised of a solenoid drive type dual-position valve including a communication position and a shut-off position. These communication position and shut-off position can be switched by supplying electric power to the solenoid.

On the other hand, the upstream and downstream of the dual-position valves 21 to 24 are connected with bypass piping 41 to 44, respectively. These bypass piping 41 to 44 are provided with non-return valves 41a to 44a, respectively. Only the fluid pressure toward the master cylinder 16 from the wheel cylinders 11 to 14 flows through the bypass piping 41 to 44.

The reservoirs 37, 39 are connected with a fluid pressure piping via pumps 45a, 45b driven by a motor not illustrated and non-return valves 47, 49, respectively. Only the fluid pressure toward the master cylinder 16 from the reservoirs 37, 39 is allowed to flow.

Detection signals of the wheel speed sensors 5 to 8 and stop switch 29 are inputted to an ECU 50 for ABS control. The ABS control ECU 50 generates, based on the above detection signals, control signals for the dual-position valves 21 to 24 and 31 to 34 and motor control signals to drive the pumps 45a, 45b. On the basis of these control signals, the dual-position valves 21 to 24 and 31 to 34 and motor are controlled for the purpose of ABS control or the like.

Figure 2:
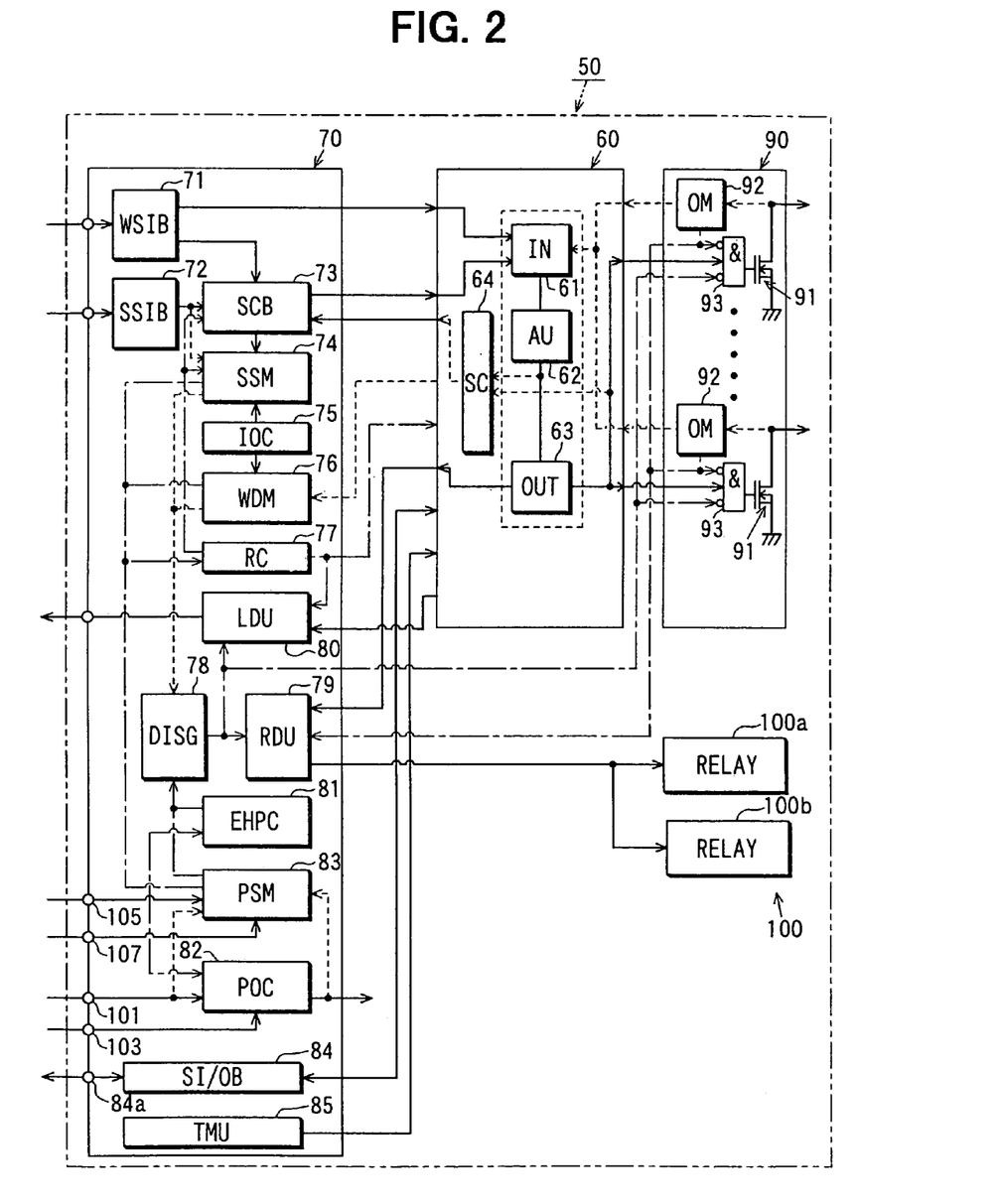
FIG. 2 is a block diagram illustrating the ECU according to the first embodiment.

FIG. 2 illustrates a block diagram illustrating the internal structure of the ABS control ECU 50. As illustrated in this figure, the ABS control ECU 50 has a plurality of chips including a microcomputer 60, a peripheral IC 70, a solenoid driver 90 and a semiconductor relay 100 or the like.

Details of each structural device of the ABS control ECU 50 will then be described. Each arrow mark in a solid line in FIG. 2 indicates a control system line, each arrow mark in a broken line indicates a monitor system line, and each arrow mark in a chain line indicates an inhibit/shut-off system line. The control system line means that a device at the front end of the arrow mark is controlled based on a signal from a device at the rear end of the arrow mark. Moreover, the monitor system line means that a device at the front end of the arrow mark monitors whether a specified device fails or not based on a signal from a device at the rear end of the arrow mark. Moreover, the inhibit/shut-off system line means that a device at the front end of the arrow mark inhibits or shuts off a drive of a specified device based on an inhibit/shut-off signal from a device at the rear end of the arrow mark.

First, the microcomputer 60 comprises an input unit 61, an arithmetic unit 62, an output unit 63. When various information pieces such as the wheel speed signals are inputted to the input unit 61, the arithmetic unit 62 performs various arithmetic operations used for ABS control based on such various information inputs. The output unit 63 generates ABS control signals, that is, solenoid drive signals and motor drive signals based on the arithmetic operation. Moreover, the microcomputer 60 is also provided with a serial communication unit 64. When various signals produced in the arithmetic operation of the arithmetic unit 62 (for example, ABS control signal indicating the ABS control condition) are inputted, these various signals are converted to a serial signal and then sent to the peripheral IC 70 as the serial signal.

Next, the peripheral IC 70 comprises a wheel speed input buffer 71, a switch (SW) signal input buffer 72, a serial communication buffer 73, a serial communication monitor unit 74, an internal oscillator circuit 75, a watch-dog (WD) monitor unit 76, a reset control unit 77, a drive inhibit signal generating unit 78, a relay drive unit 79, a lamp drive circuit 80, an excessive-heating protection circuit 81, a power supply monitor unit 82, a power supply output circuit 83, a signal input/output buffer 84 and a temperature monitor unit 85. Each device circuit or unit is integrated into one chip to form the peripheral IC 70.

The wheel speed input buffer 71 performs waveform shaping to correct the detection signals transmitted from the wheel speed sensors 5 to 8 of FIG. 1 into a rectangular shape. The wheel speed signal shaped in the waveform by this wheel speed input buffer 71 is then inputted to the microcomputer 60 for various arithmetic operations of wheel speeds and estimated body speed used for ABS control. Moreover, the wheel speed input buffer 71 also detects a breakage of wire connecting the wheel speed sensors 5 to 8 and the ABS control ECU 50. This buffer 71 transmits a wire breakage signal indicating the breakage of wire to the serial communication buffer 73 when the wire breakage is detected.

The SW signal input buffer 72 monitors ON/OFF signal of the stop switch 29 and a signal indicating that the power is fed or not to the solenoids of the dual-position valves 21 to 24, 31 to 34 (for example, a voltage value applied on the solenoid) indicated in FIG. 1. Thereby, the ON/OFF signal indicating whether the brake pedal 27 is stepped on or not and the ON/OFF signal indicating whether the electric power is supplied to the solenoid or not can be outputted.

The serial communication buffer 73 converts a wire breakage signal from the wheel speed input buffer 71 and the ON/OFF signal from the SW signal input buffer 72 to the serial signal, and then transmits the serial signal to the microcomputer 60. A serial signal from the microcomputer 60 is then transmitted to this serial communication buffer 73.

The serial signal monitor unit 74 monitors the microcomputer 60 based on the serial signal from the serial communication buffer 73. More specifically, the serial communication buffer 73 receives the result of arithmetic operation from the microcomputer 60 based on the signals from the wheel speed input buffer 71 and SW signal input buffer 72 to monitor whether this signal is normal or not. For example, when the signal indicating the ABS control condition is transmitted from the serial control unit 64 in spite that the OFF signal indicating that the stop switch 29 is not stepped on is transmitted from the SW signal input buffer 72, it is determined that the serial signal from the microcomputer 60 is not normal. When the serial signal from the microcomputer 60 is not normal, a reset signal is outputted to the reset control unit 77 described later or an inhibit signal is transmitted to the drive inhibit signal generating circuit 78.

The internal oscillator unit 75 forms an internal clock used in the serial signal monitor unit 74 and the WD monitor unit 76 or the like. In this internal oscillator unit 75, a plurality of clock signals are generated at different time points (timings) and the serial signal monitor unit 74 and WD monitor unit 76 select the clock signal of appropriate timing as a monitor signal to realize a monitoring function.

The WD monitor unit 76 monitors whether the arithmetic operation in the microcomputer 60 is performed normally or not based on the data such as arithmetic operation period produced from the microcomputer 60. For example, since the WD monitor signal is produced as a signal that is alternately inverted when the arithmetic operation is performed normally, if the WD monitor signal is not inverted alternately, it indicates that the arithmetic operation of the microcomputer 60 is not executed normally. When the arithmetic operation of the microcomputer 60 is not executed in the normal period, a reset signal is outputted to the reset control unit 77 described later or the inhibit signal is transmitted to the drive inhibit signal generating circuit 78.

At the time of initialization or when the reset signal is inputted to the reset control unit 77 from the serial signal monitor unit 74, WD monitor unit 76 and power supply monitor unit 83 described later, the reset signal is transmitted to the microcomputer 60. Upon reception of this reset signal, the microcomputer 60 sets the values thereof to a mode of a predetermined reset condition. For example, the microcomputer 60 stops all arithmetic operations. Moreover, this reset signal is also transmitted to the serial communication buffer 73 and serial signal monitor unit 74 for the purpose of initialization based on this reset signal.

The drive inhibit signal generating unit 78 transmits a solenoid drive inhibit signal and a motor drive inhibit signal to the relay drive unit 79 based on the inhibit signals from the serial signal monitor unit 74, the WD monitor unit 76, the excessive-heating protection circuit 81 and power supply monitor unit 83 described later and also transmits directly the drive inhibit signal to a solenoid drive driver 90 without via the microcomputer 60. Therefore, when the solenoid drive inhibit signal is transmitted from the drive inhibit signal generating unit 78, the drive of solenoids is inhibited even when the microcomputer 60 is in operation.

The relay drive unit 79 controls switching of a semiconductor relay unit 100 and also controls power supply to the motor to drive the solenoids and pumps 45a, 45b based on the solenoid drive signals and motor drive signal from the microcomputer 60. Moreover, when the solenoid drive inhibit signal and motor drive inhibit signal are inputted from the drive inhibit signal generating unit 78 and the output monitor unit 92 of the solenoid driver 90, the relay drive unit 79 stops power supply to the solenoids and to the motor with the semiconductor relay unit 100.

The lamp drive unit 80 outputs under the normal condition the operating condition of the ABS control based on an ABS control condition signal from the microcomputer 60. However, it outputs a non-operating condition of the ABS control when the reset signal from the reset control unit 77 is inputted or when the solenoid drive inhibit signal and the motor drive inhibit signal are inputted from the drive inhibit signal generating unit 78. The lamp not illustrated lights up by receiving the signal from the lamp drive unit 80 to ensure the operating condition of the ABS control.

The excessive-heating protection circuit 81 detects that the chip has reached a predetermined temperature in order to prevent that the chip providing the peripheral circuit 70 reaches the predetermined temperature. When the chip has reached the predetermined temperature, the drive inhibit signal generating unit 78 is caused to generate the inhibit signal and stop supply of voltage to the microcomputer 60 in view of preventing further temperature rise.

The power supply output circuit 82 corresponds to a monitored block and is connected to a power supply terminal (first power supply terminal) 101 and a ground terminal (first ground terminal) 103 connected to an external power supply allocated at the outside of the ECU 50. The power supply output circuit 82 outputs a predetermined voltage (for example, 5V, 3.3V) based on the voltage applied to the power supply terminal 101. An output voltage of the power supply output circuit 82 is used as a power supply voltage of the microcomputer 60, the peripheral IC 70 and the solenoid driver 90 or the like. Details of this power supply circuit 82 will be described later.

The power supply monitor unit 83 corresponds to a monitor block and is connected to a power supply terminal (second power supply terminal) 105 other than the power supply terminal 101 connected with the power supply output circuit 82 and a ground terminal (second power supply terminal) 107. The power supply monitor unit 83 monitors whether the output voltage of the power supply output circuit 82 is the predetermined value or not and also monitors whether the voltage applied to the power supply output circuit 82 is an excessive voltage or not. For example, when the output voltage of the power supply output circuit 82 is less than the predetermined voltage, a reset signal is transmitted to the reset control unit 77. When it is higher than the predetermined value, an inhibit signal is transmitted to the drive inhibit signal generating unit 78. Moreover, the voltage applied to the power supply output circuit 82 is excessive voltage, the inhibit signal is outputted to the drive inhibit signal generating unit 78 and supplying of voltage to the microcomputer 60 is stopped to prevent excessive-heating. Details of this power supply monitor unit 83 will be described later.

The signal input/output buffer 84 is connected to a terminal 84a for checking for diagnosis when a car has a failure and makes communication with the microcomputer 60 by connecting a tester to the terminal 84a. Moreover, the signal input/output buffer 84 may be used as only an output buffer, for example, as a buffer which outputs the signal for indicating a vehicle speed displayed on a vehicle speed meter (for example, a signal corresponding to the estimated vehicle speed calculated from the wheel speed).

The temperature monitor unit 85 always detects temperature of the ECU 50. The temperature monitor unit 85 outputs the signal depending on the temperature of ECU 50 to the microcomputer 60 as a temperature detection signal. Based on this temperature detection signal, the microcomputer 60 performs the arithmetic operation for the ABS control depending on the detected temperature.

The solenoid driver 90 comprises MOS transistors 91 connected to the solenoids, output monitor units 92 for monitoring voltage supply condition to the solenoids (MOS transistors 91) and AND circuits 93 for ON/OFF drive of the MOS transistors 91.

The MOS transistors 91 are connected to the respective solenoids of the various control valves 21 to 24, 31 to 34 illustrated in FIG. 1 to execute switching for voltage supply.

The output monitor units 92 are provided on one-to-one basis to the solenoids to monitor a driver output to each solenoid. For example, it monitors the voltage supplying condition to the solenoid based on the drain voltage and drain current of the MOS transistor 91. Thereby, for example, it is detected whether a drain current is excessive or not and whether a power supply wire to the solenoid is open or not or the current is leaking or not, and moreover whether the MOS transistor 91 is in the excessively high temperature or not. Thereby, if the result not suitable for driving the solenoid is attained, the output monitor unit 92 transmits the solenoid drive inhibit signal and the motor drive inhibit signal to the relay drive unit 79 and also outputs the solenoid drive inhibit signal to the AND circuit 93.

To the AND circuit 93, an output signal of the microcomputer 60, an output signal from the relay drive unit 79, an output signal from the drive inhibit signal generating unit 78 and an output signal from the output monitor unit 92 are inputted. In the case of this embodiment, the output signals from the relay drive unit 79, the drive inhibit signal generating unit 78 and the output monitor unit 92 are normally at low level. However, if any failure occurs, it turns to high level and the output of the AND circuit 93 becomes low, that is, the MOS transistor 91 turns off.

Thus, the solenoid driver 90 not only shuts off the power supply to the solenoid based on the signal from the microcomputer 60 and peripheral IC 70 but also shuts off the power supply to the solenoid based on the signal from the output monitor unit 92 provided within the solenoid driver 90 itself.

In the semiconductor relay unit 100, the power supply to the solenoids is switched by a semiconductor relay 100a, while the power supply to the motor to drive the pumps 45a, 45b is switched by a semiconductor relay 100b. These semiconductor relays 100a, 100b are constructed to be controlled on the basis of the signal from the relay drive unit 79 to normally enable power supply to the solenoids and the motors and to disable the power supply to the solenoids and the motors upon reception of the solenoid drive inhibit signal and the motor drive inhibit signal from the relay drive unit 79.

Figure 3:
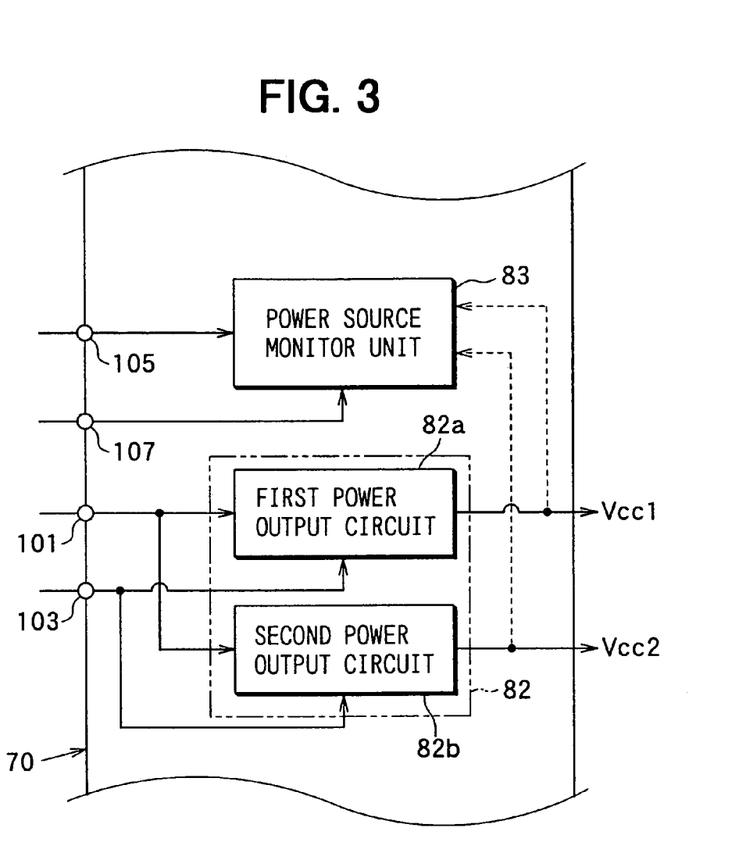
FIG. 3 is a block diagram illustrating a power output circuit used in the first embodiment.

The power output circuit 82 of FIG. 2 is illustrated in detail in FIG. 3. As illustrated in this figure, the power output circuit 82 is comprised of a dual power source circuit including a first power output circuit 82a for outputting a first power source output Vcc1 (for example, voltage of 5V) and a second power output circuit 82b for outputting a second power source output Vcc2 (for example, voltage of 3.3V) which is lower than the first power source output Vcc1.

Figure 4:
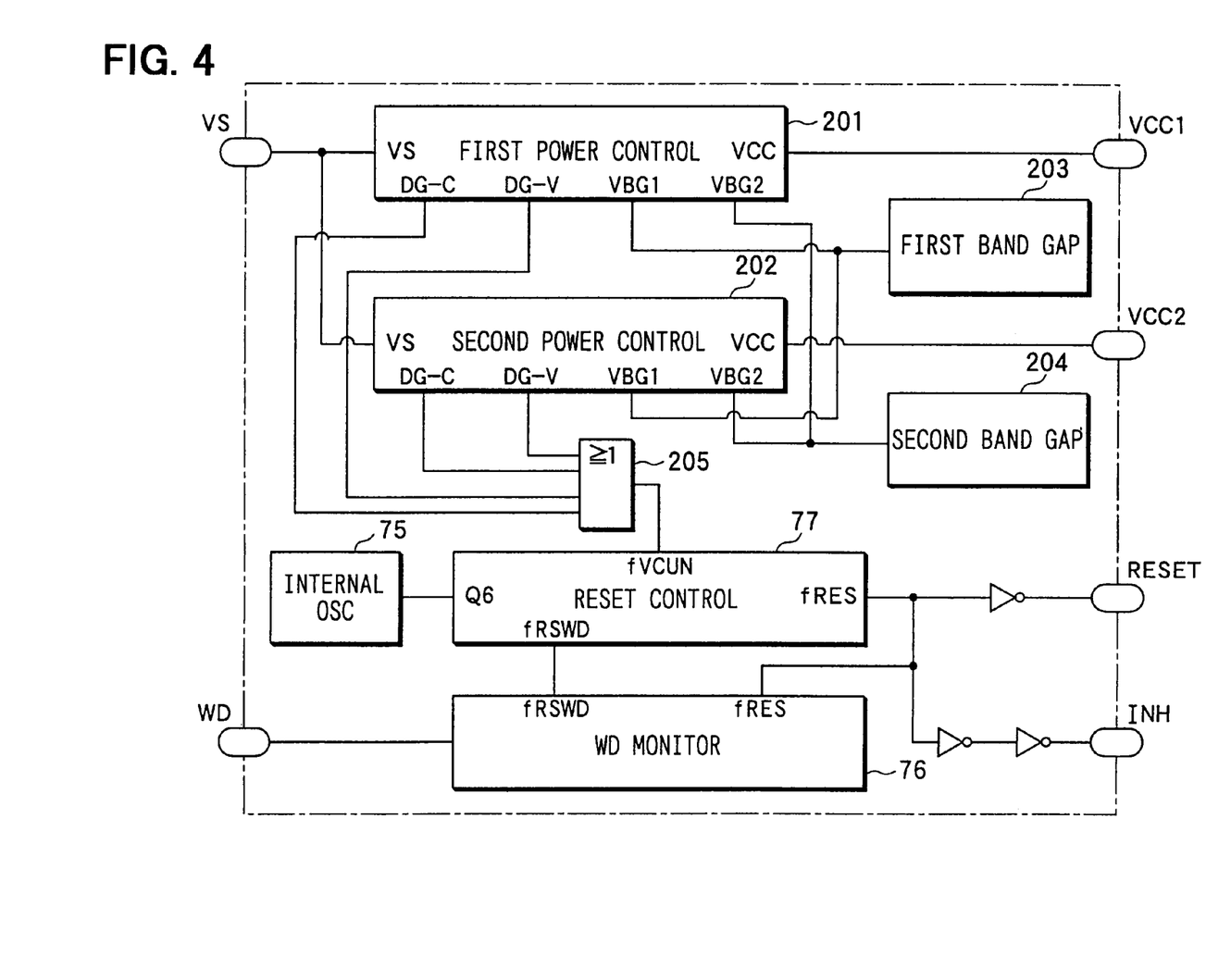
FIG. 4 is a detailed circuit diagram illustrating the power output circuit shown in FIG. 3 and associated circuits.

The practical circuit structure of this power output circuit 82 and the other blocks is illustrated in FIG. 4. The power output circuit 82 and the power source monitor unit 83 are comprised of first and second power source control circuits 201, 202 and first and second band gap reference power source circuits 203, 204.

Figure 5:
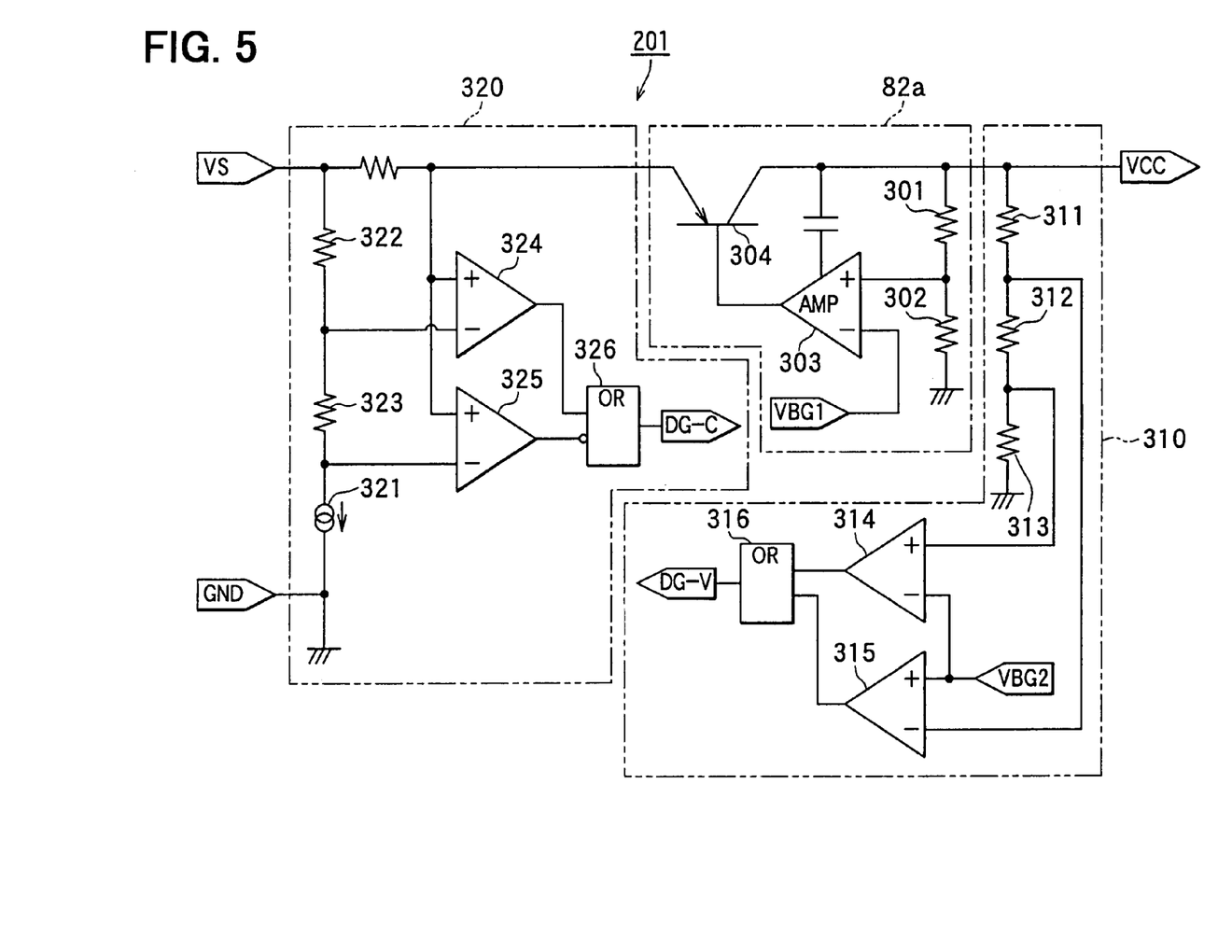
FIG. 5 is a detailed circuit diagram illustrating a first power source control circuit shown in FIG. 3.

Of these circuits, the power output circuit 82 is comprised of the first and second power source control circuits 201, 202. FIG. 5 illustrates a practical circuit structure of the first power source control circuit 201. Based on these FIG. 4 and FIG. 5, details of the power output circuit 82 and the power source monitor unit 83 will be described. Here, since the circuit structure of the second power source control circuit 202 is identical to the first power source control circuit 201 except for that the constants of circuit devices are different.

As illustrated in FIG. 5, the first power output circuit 82a is comprised within the first power source control circuit 201. To this first power output circuit 82a, an external power source voltage VS is applied via the power source terminal 101 and the first power source control circuit 201 outputs the voltage Vcc1 based on this power source voltage VS and a reference voltage VBG1 formed with the first band gap reference power source circuit 203 provided in the power source monitor unit 83. More specifically, the Vcc1 terminal is set to the voltage within a specified range by adjusting an output of an amplifier 303 based on the voltage divided by resistors 301 and 302 and the reference voltage VBG1 through adjustment of the constants of the resistors 301 and 302 and then controlling a current flowing into a PNP transistor 304.

The first power source control circuit 201 has a voltage abnormality detecting circuit (first voltage abnormality detecting circuit) 310 providing a part of the power source monitor unit 83. The voltage of the Vcc1 terminal is compared with a reference voltage VBG2 formed by the second band gap reference power source circuit 83b provided in the power source monitor unit 83 in this voltage abnormality detecting circuit 310 in order to monitor whether the voltage of the Vcc1 terminal is accurately set or not to the voltage in a predetermined range. That is, a high voltage abnormality or a low voltage abnormality where the voltage of the Vcc1 terminal becomes higher or lower than the specified voltage can be detected.

More specifically, the voltages at two portions divided by resistors 311 to 313 are compared with the reference voltage VBG2 formed by the second band gap reference power source circuit 204 by two comparators 314, 315. If the voltage of the Vcc1 terminal is not in a predetermined range, a high level is outputted as the voltage abnormality signal from an OR circuit 316. The output of this OR circuit 316 corresponds to an output of the DG-V terminal of FIG. 4.

Moreover, the first power source control circuit 201 has a current abnormality detecting circuit (first current abnormality detecting circuit) 320 to detect whether a current flowing into the first power output circuit 82a is set to a current value in a predetermined range or not. This current abnormality detecting circuit 320 detects an excessive current abnormality or a low current abnormality, where the current flowing to the first power output circuit 82 is higher or lower than a predetermined current value.

More specifically, the constant voltages of two positions formed by a constant current source 321 and resistors 322, 323 are compared with the voltage of the voltage supply line connected to the first power output circuit 82a by two comparators 324, 325. When an excessive current is generated in the first power output circuit 82a, an OR circuit 326 outputs a high level as a current abnormality signal. An output of this OR circuit 326 corresponds to an output of the DG-C terminal of FIG. 4.

As described above, although the circuit structure of the second power source control circuit 202 is identical to that of FIG. 5, a constant of the resistor 301 is different for the circuit structure of the first power source control circuit 201 and the voltage of the Vcc2 terminal is set to the voltage of a predetermined range that is lower than that of the Vcc1 terminal. Thereby, the high voltage abnormality and low voltage abnormality and moreover excessive current abnormality and low current abnormality of the second power source control circuit 202 can be detected. Here, the voltage abnormality detecting circuit provided in the second power source control circuit 202 corresponds to a second voltage abnormality detecting circuit and the current abnormality detecting circuit corresponds to the second current abnormality detecting circuit.

As described above, the outputs from the DG-C terminal and DG-V terminal of the fist and the second power source control circuits 201, 201 of FIG. 4 are inputted to the reset control unit 77 via an OR circuit 205. The reset control unit 77 outputs the reset signal based on a signal fVCUN inputted in this timing.

Figure 6:
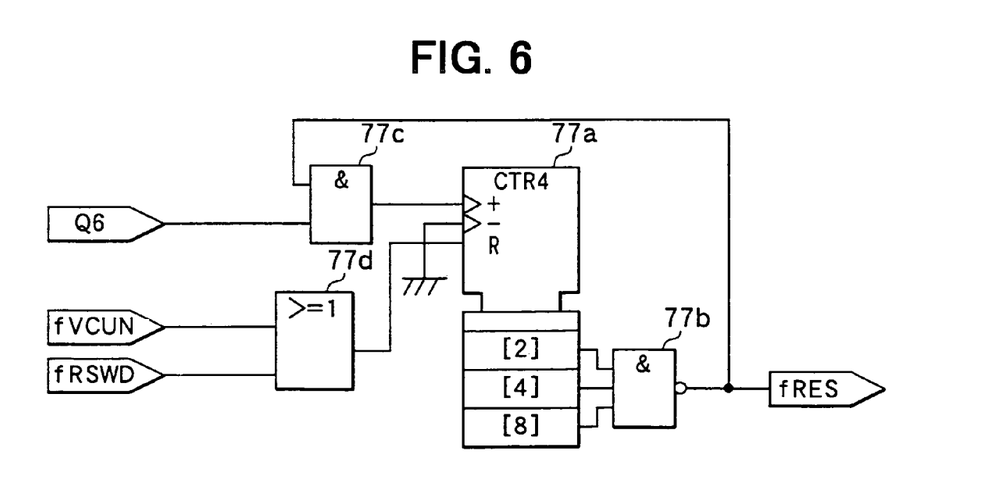
FIG. 6 is a detailed circuit diagram illustrating a reset control unit shown in FIG. 4.

More specifically, a logical structure of the reset control unit 77 is illustrated in FIG. 6. Here, a signal Q6 illustrated in this figure is one of clock signals generated by the internal oscillator unit 75 illustrated in FIG. 2 and FIG. 4.

A counter 77a illustrated in the figure does not conduct a counting operation in the initial condition but since an output of an AND circuit 77b becomes high level, the counter starts a count-up operation to final digits with the high level signal outputted in synchronism with the rise timing of a signal Q6 from an AND circuit 77c. Therefore, an output of the AND circuit 77b becomes low level and the counter 77b maintains the counting condition up to the final digits. Thereby a signal fRES corresponding to the reset signal becomes low level.

On the other hand, when a voltage abnormality or a current abnormality is detected, the signal fVCUN becomes high level. Therefore, an output of the OR circuit 77d becomes high level and thereby the counter 77b is reset. Accordingly, the output of the AND circuit 77b becomes high level and a reset signal is produced to reset the microcomputer 60.

Here, a signal fRSWD is an abnormality detection signal from the WD monitor unit 76 of FIG. 4. Even when an abnormality is detected by the WD monitor unit 76, the reset signal is produced to reset the microcomputer 60 by the operation similar to that described above.

As described above, in this embodiment, since both outputs from the first and second power output circuits 82*a*, 82*b* are monitored, not only the high voltage side but also the low voltage side are monitored to ensure the operation of the microcomputer 60.

Since a low voltage abnormality and an excessive current abnormality are detected by both first and second power output circuits 82*a*, 82*b*, operations of the microcomputer 60 and each circuit (peripheral circuits) in the ECU 50 for ABS control can be ensured.

In addition, if no means for detecting the low voltage abnormality is provided in this embodiment, even when the power source line to the microcomputer to supply the power source voltage of the low voltage side is broken or opened, such an abnormality cannot be detected. On the contrary, since the low current abnormality can be detected in the second power output circuit 82*b*, wire breakage or the like of the power source line connecting the Vcc2 terminal and the microcomputer 60 to supply the power source voltage at the low voltage side can also be detected.

Second Embodiment

In a second embodiment, a power source driving sequence in the dual power source circuit is added to the first embodiment. The operation of the microcomputer 60 becomes unstable at the time of driving ON and OFF the power source of the dual power source circuit. In the second embodiment, the driving sequence of the power source in the dual power source circuit is regulated in order to prevent unstable operation of the microcomputer 60.

Figure 7:
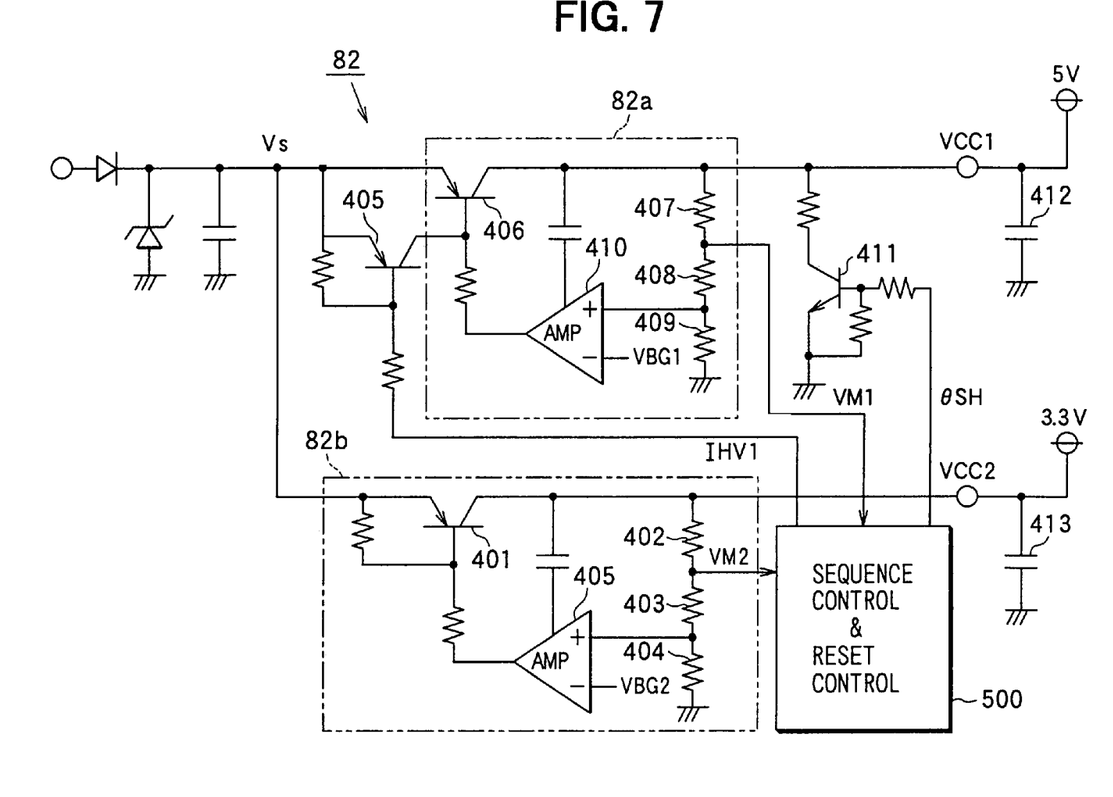
FIG. 7 is a detailed circuit diagram illustrating each power source in a dual power source circuit according to a second embodiment of the invention.
Figure 8:
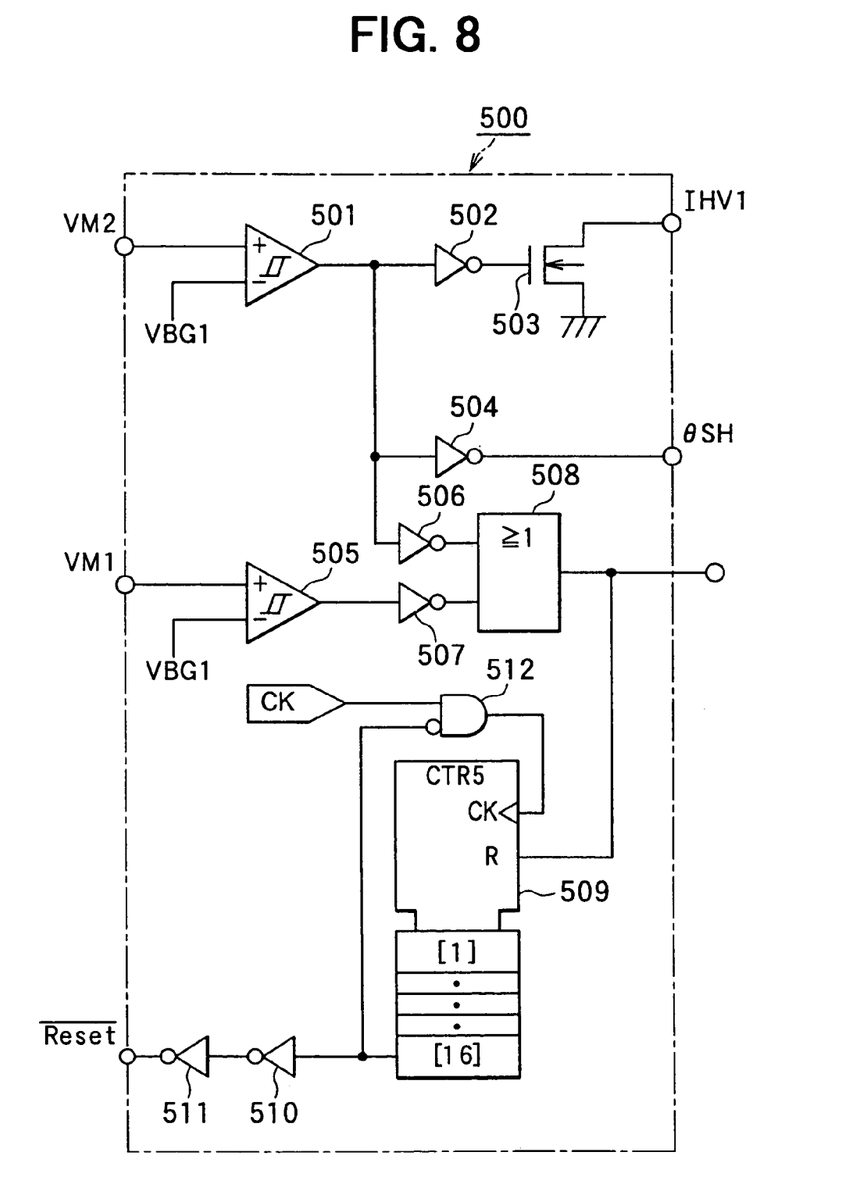
FIG. 8 is a detailed circuit diagram illustrating a power output circuit used in the second embodiment.
Figure 9:
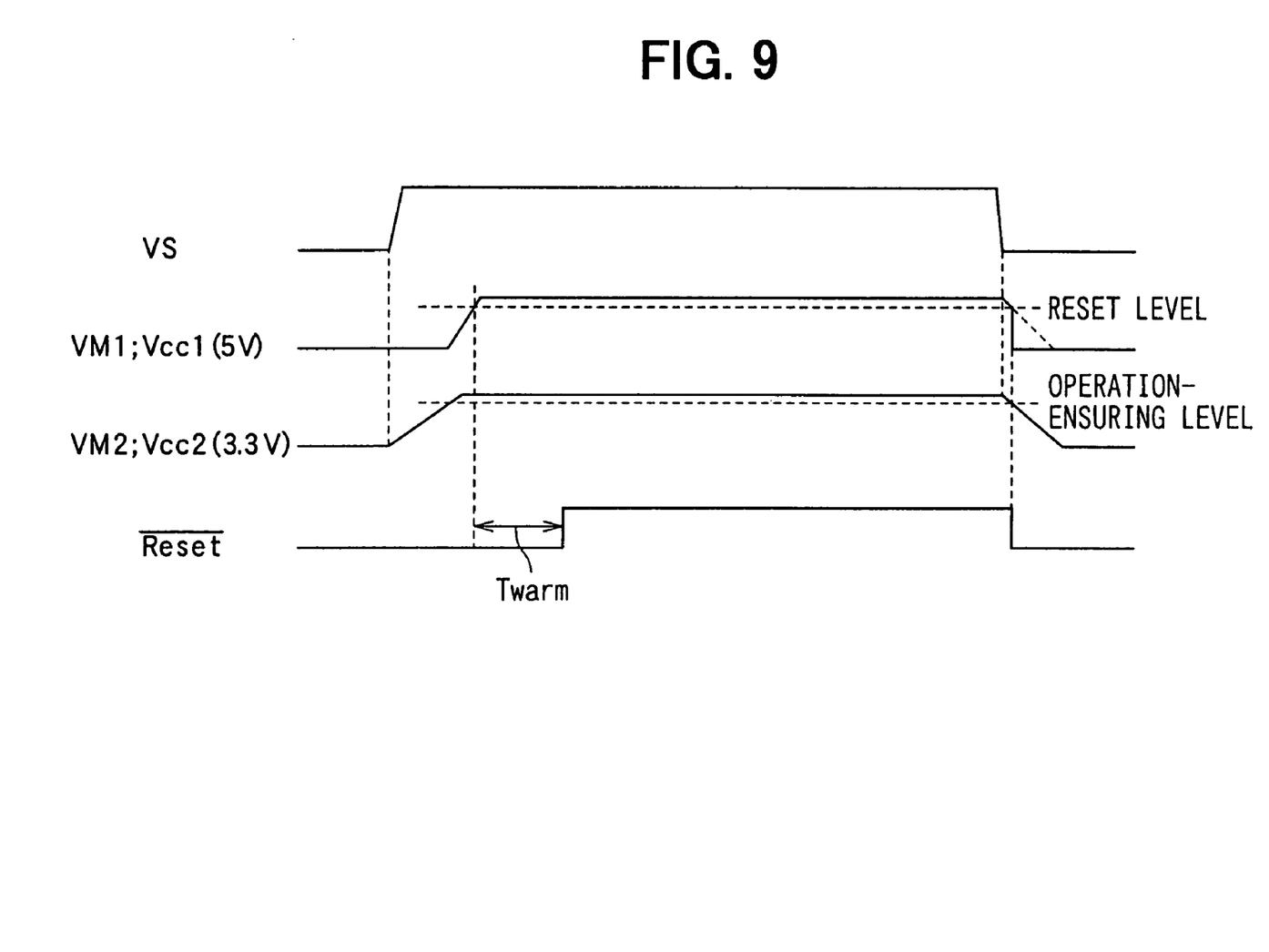
FIG. 9 is a timing diagram illustrating an operation of the power output circuit shown in FIG. 8.

FIG. 7 illustrates a practical circuit structure of the power output circuit 82 of this embodiment, while FIG. 8 illustrates a practical logical structure of a control unit 500 for effecting the sequence control and reset control in FIG. 7. Moreover, FIG. 9 illustrates voltage waveforms at each part of the power output circuit 82 when the power source voltage VS is applied. Operations of the power output circuit 82 in this embodiment will be described with reference to these figures.

First, when the power source voltage VS is applied to the power output circuit 82 in order to drive each power source 82*a*, 82*b*, a PNP transistor 401 provided in the second power output circuit 82*b* of FIG. 7 turns on. Thereby, an output of an amplifier 405 is adjusted on the basis of a voltage divided by resistors 402 to 404 and the reference voltage VBG2 formed by the second band gap reference power source circuit 204, the voltage of the Vcc2 terminal rises and the power source rises in the second power output circuit 82*b*.

On the other hand, since a voltage VM2 divided by resistors 402 to 404 is lower than a reference voltage Vref before the power source of the Vcc2 terminal rises, an output of a comparator 501 of FIG. 8 becomes low level and a MOS transistor 503 turns on through an inverter 502.

Therefore, a current flows via an IHV1 terminal of the control unit 500, thereby a PNP transistor 405 of FIG. 7 turns on, the PNP transistor 406 turns off and the power source does not rise in the first power output circuit 82*a*.

At this time point, since an output of the comparator 501 becomes low level, an inverter circuit 504 outputs a high level and a NPN transistor 411 turns on via a θ SH terminal. Therefore, even if a capacitor 412 is charged, the charges are pulled via the NPN transistor 411.

Subsequently, when the voltage VM2 exceeds the reference voltage VBG2 after the power source of the second power source circuit 82*b* rises, the comparator 501 outputs a high level and the MOS transistor 503 turns off.

Thereby, the PNP transistor 405 turns off and the PNP transistor 406 turns ON. Thereby, an output of the amplifier 410 is adjusted on the basis of the voltage divided by the resistors 407 to 409 and the reference voltage VBG1 formed by the first band gap reference power source circuit 203. The voltage of the Vcc1 terminal rises and the power source of the first power output circuit 82*a* rises.

As described above, it is possible that, after the power source of the second power output circuit 82*b* that is the power source for the reset control unit in the microcomputer 60 rises, the power source in the first power output circuit 82*a* as the other power source rises.

Moreover, since the voltage of the VM2 terminal and the voltage of the VM1 terminal are lower than the reference voltages VBG2, VBG1 before each power source rises, the outputs of the comparators 501 and 505 are in the low level. Therefore, outputs of the inverter circuits 506, 507 become high level, the output of the OR circuit 508 becomes high level, the counter 509 is reset and a low level is outputted from the reset terminal via the inverter circuits 510, 511 of the even number. An output signal of this reset terminal corresponds to the reset signal and when the low level is outputted from the reset terminal, the microcomputer 60 is reset.

When respective power sources operate and the voltages of the Vcc1 terminal and Vcc2 terminal exceed the operation-ensuring voltage, an output of the OR circuit 508 becomes low level. As a result, the AND circuit outputs the high level in synchronization with a rise pulse of the clock signal of the internal oscillator unit 75 and the counter 509 starts the counting operation.

Thereafter, when the counter 509 counts up to the final digit, a high level is outputted from the reset terminal. That is, after waiting for the warm-up time of the microcomputer 60 or the like, a signal for canceling the reset condition of the microcomputer 60 is outputted from the reset terminal.

As described above, since the power output circuit 82 of this embodiment drives first the power source of the reset control unit 77 of the microcomputer 60 and then cancels the reset condition of the microcomputer 60 after the voltages of the Vcc1 terminal and Vcc2 terminal exceed the operation-ensuring level, the reset condition in the microcomputer 60 does not become unstable. Therefore, it is possible to prevent that the operation of the microcomputer 60 is uncontrolled and I/O output becomes unstable. Further, malfunction of the circuit in the ECU 50 for ABS control can also be prevented.

Next, when supply of the power source voltage VS to the power output circuit 82 is stopped to fall each power source, both power sources of the first power output circuit 82*a* and the second power output circuit 82*b* fall. When the voltage VM2 of the second power output circuit 82*b* becomes lower than the circuit operation-ensuring voltage level, an output of the comparator 501 of FIG. 8 becomes low level, the output of the inverter circuit 502 becomes high level, the MOS transistor 503 turns on, the IHV1 output becomes low level, a base current of the PNP transistor 405 flows to turn on the PNP transistor 405 and also turn off the PNP transistor 406. On the other hand, the output of the inverter circuit 504 becomes high level. Thereby, the NPN transistor 411 turns on via the θ SH terminal, charges of the capacitor 412 are pulled out through the NPN transistor 411 and the power source of the first power output circuit 82*a* falls momentarily.

When the voltage VM1 of the first power output circuit 82a becomes lower than the voltage of the reset level, the output of the comparator 505 becomes low level, the counter 509 is reset and a low level is outputted from the reset terminal. Thereby, the microcomputer 60 is reset.

On the other hand, the power source of the second power output circuit 82b falls at a rate determined by the time constant of the capacitor 413 or the like and at the time point later than the fall at least of the power source of the first power output circuit 82a.

As described above, since the microcomputer 60 is immediately reset when one of power sources becomes lower than the operating assuring voltage level, the microcomputer 60 is surely reset. Moreover, since the power source of the control unit 500 for the reset control, that is, the power source of the second power output circuit 82b falls at the latest time point, it can be prevented that operation of the microcomputer 60 is uncontrolled and the I/O output becomes unstable. Moreover, malfunction of the circuit in the ECU 50 for ABS control can also be prevented.

Other Embodiments

In the first and second embodiments, the power output circuit 82 is comprised of the dual power source circuit, but the present invention can also be adapted to a plurality of power source circuits providing two or more power sources.

In this case, the similar effect as that of the first embodiment can also be attained by detecting high voltage abnormality, low voltage abnormality, excessive current abnormality and low current abnormality in all circuits of a plurality of power source circuits.

Moreover, the similar effect as that of the second embodiment can also be attained by providing a structure that the power source of the microcomputer rises earlier than the other power sources among a plurality of power sources and falls later than the other power sources.

Moreover, although not illustrated in FIG. 4, it is also possible by connecting a Zener diode to the Vcc1 and Vcc2 terminals to prevent that the voltages of the Vcc1 and Vcc2 terminals become higher than that in a predetermined range.

Further modifications and alterations are also possible without departing from the spirit of the invention.

What is claimed is:

1. An electronic control apparatus comprising:
a plurality of power source circuits providing a plurality of power sources of a plurality of different voltages; and
a microcomputer,
wherein any one of the plurality of power sources is used as a power source of the microcomputer,
wherein the microcomputer is reset immediately when it is detected that any one of the plurality of power sources is not set to a voltage in respective specified ranges by checking whether the plurality of power sources are respectively set to the voltages in the specified ranges,
the microcomputer has a CPU, a peripheral circuit, an analog-digital converting unit, a reset control unit and an oscillation circuit;
the power source circuits have a first power output circuit outputting a first voltage that is applied to the peripheral circuit and the analog-digital converting unit, and a second power output circuit outputting a second voltage that is lower than the first voltage and applied to the reset control unit, the oscillation circuit and the CPU;
a first voltage abnormality detecting circuit is provided for detecting that the first voltage is lower than a specified voltage thereof;
a second voltage abnormality detecting circuit is provided for detecting that the second voltage is lower than a specified voltage;
the microcomputer is reset immediately when any one of the first voltage and the second voltage is detected to be lower than the first specified voltage and the second specified voltage by any one of the first and second abnormality detecting circuits,
wherein:
a first current abnormality detecting unit is provided for detecting that a current flowing into the first power output circuit is outside a first specified range; and
a second current abnormality detecting unit is provided for detecting that a current flowing into the second power output circuit is outside a second specified range,
wherein the microcomputer is reset immediately when any one of the currents flowing into the first power output circuit and the second power output circuit is detected as being outside the first specified range and the second specified range by any one of the first current abnormality detecting circuit and the second current abnormality detecting circuit.

2. An electronic control apparatus comprising:
first and second power source circuits providing first and second power sources with first and second voltages different from one another, respectively;
a microcomputer connected to the first and second power source circuits and operable with the first and second voltages;
a first abnormality detection circuit for detecting an abnormal value of the first voltage and an abnormal value of a first current in the first power source circuit, the abnormal levels of the first voltage and the first current being outside predetermined first voltage and current ranges, respectively;
a second abnormality detection circuit for detecting an abnormal value of the second voltage and an abnormal value of a second current in the second power source circuit, the abnormal values of the second voltage and the second current being outside predetermined second voltage and current ranges, respectively; and
a reset control circuit for immediately resetting the microcomputer in response to an abnormality signal generated by either of the first and the second abnormality detection circuits.

* * * * *